United States Patent
Brostmeyer

(10) Patent No.: US 8,461,710 B1
(45) Date of Patent: Jun. 11, 2013

(54) HIGH SPEED INDUSTRIAL GAS TURBINE ENGINE WITH CO-ROTATING GENERATOR FOR HIGH SPEED USE

(71) Applicant: Florida Turbine Technologies, Inc., Jupiter, FL (US)

(72) Inventor: Joseph D Brostmeyer, Jupiter, FL (US)

(73) Assignee: Florida Turbine Technologies, Inc., Jupiter, FL (US)

( * ) Notice: Subject to any disclaimer, the term of this patent is extended or adjusted under 35 U.S.C. 154(b) by 0 days.

(21) Appl. No.: 13/759,808

(22) Filed: Feb. 5, 2013

Related U.S. Application Data

(63) Continuation of application No. 12/683,628, filed on Jan. 7, 2010, now abandoned.

(51) Int. Cl.
*F01D 15/10* (2006.01)
*F02C 6/00* (2006.01)
*H02K 7/18* (2006.01)
*H02P 9/04* (2006.01)
*H02P 1/26* (2006.01)
*H02P 1/42* (2006.01)

(52) U.S. Cl.
USPC .............................................. 290/52; 318/730

(58) Field of Classification Search
USPC .............................................. 290/52; 318/730
See application file for complete search history.

(56) References Cited

U.S. PATENT DOCUMENTS

| | | | |
|---|---|---|---|
| 8,365,510 B2* | 2/2013 | Lugg | 60/39.01 |
| 8,375,695 B2* | 2/2013 | Schilling et al. | 60/39.162 |

* cited by examiner

*Primary Examiner* — Pedro J Cuevas
(74) *Attorney, Agent, or Firm* — John Ryznic

(57) ABSTRACT

An electric power plant with a gas turbine engine that drives an electric generator, where the generator is a co-rotating electric generator positioned between the turbine and the compressor such that the turbine drives the compressor through the electric generator, and where the co-rotating generator includes a rotor and a stator that both rotate in the same direction but with a differential rotational speed of around 3000 or 3,600 rpm in order to produce 50 or 60 hertz electrical power. A wire brush makes contact with a rotating surface of the generator to carry away electricity, and the wire brush is continuously fed to make up for wear.

13 Claims, 1 Drawing Sheet

HIGH SPEED INDUSTRIAL GAS TURBINE ENGINE WITH CO-ROTATING GENERATOR FOR HIGH SPEED USE

CROSS-REFERENCE TO RELATED APPLICATIONS

This application is a CONTINUATION of U.S. patent application Ser. No. 12/683,628 filed on Jan. 7, 2010 and entitled CO-ROTATING GENERATOR FOR HIGH SPEED USE.

GOVERNMENT LICENSE RIGHTS

None.

BACKGROUND OF THE INVENTION

1. Field of the Invention

The present invention relates generally to an electric generator, and more specifically to a small gas turbine engine with an electric generator.

2. Description of the Related Art Including Information Disclosed Under 37 CFR 1.97 and 1.98

A gas turbine engine is used to drive an electric generator to produce electrical energy. A large industrial gas turbine (IGT) engine, like those used in the power producing industry, is directly connected to an input shaft of an electric generator in order to eliminate the need for a gear box in order to slightly increase the overall engine efficiency and the cost and efficiency. Because of the direct drive connection, the IGT engine needs to operate at the same speed as the generator, which will be 60 Hertz (3,600 rpm) in the USA and 50 Hertz (3,000 rpm) in Europe. This is possible because of the large size of these engines.

However, smaller gas turbine engines are also being used to drive electric generators to produce power, such as in areas without electrical power lines like offshore oil rigs or in military battlefields. A small gas turbine engine that operates around 50,000 rpms will require a gear box to reduce the rotational speed down to a level (3,600 or 3,000 rpm) that is acceptable for a 50 or 60 hertz electric generator. A gear box will wear relatively quickly and require maintenance to replace worn gears before the engine requires service. High speed electric generators are known in which the generator shaft can be directly connected to the high speed shaft of the IGT, but these high speed generators are expensive to produce and difficult to design since they require complex electrical power conditioning electronics to change the frequency of the output power to a desired frequency.

BRIEF SUMMARY OF THE INVENTION

A co-rotating electric generator for use in a gas turbine engine that operates at high rotational speeds, where a turbine of the engine is connected to one of the two rotating parts of the generator and the compressor is connected to the other of the two parts of the generator such that the turbine drives the compressor through the generator, and where the relative rotational peed of the two generator parts is 3,000 or 3,600 rpm so that no gear box to reduce the rotational speed is required to produce 50 or 60 hertz electricity. The relative rotational speed of the generator parts can be controlled by electronics or a mechanical resistance.

The co-rotating electric generator is located between the turbine and the compressor of the gas turbine engine. The turbine can be oriented such that the reaction force operating on the turbine will push the turbine toward the generator and the compressor being oriented such that the reaction force operating on the compressor will operate to push the compressor toward the generator. This will minimize the need for thrust balancing of the turbine and the compressor on the rotor shafts.

DETAILED DESCRIPTION OF THE INVENTION

Figure 1:
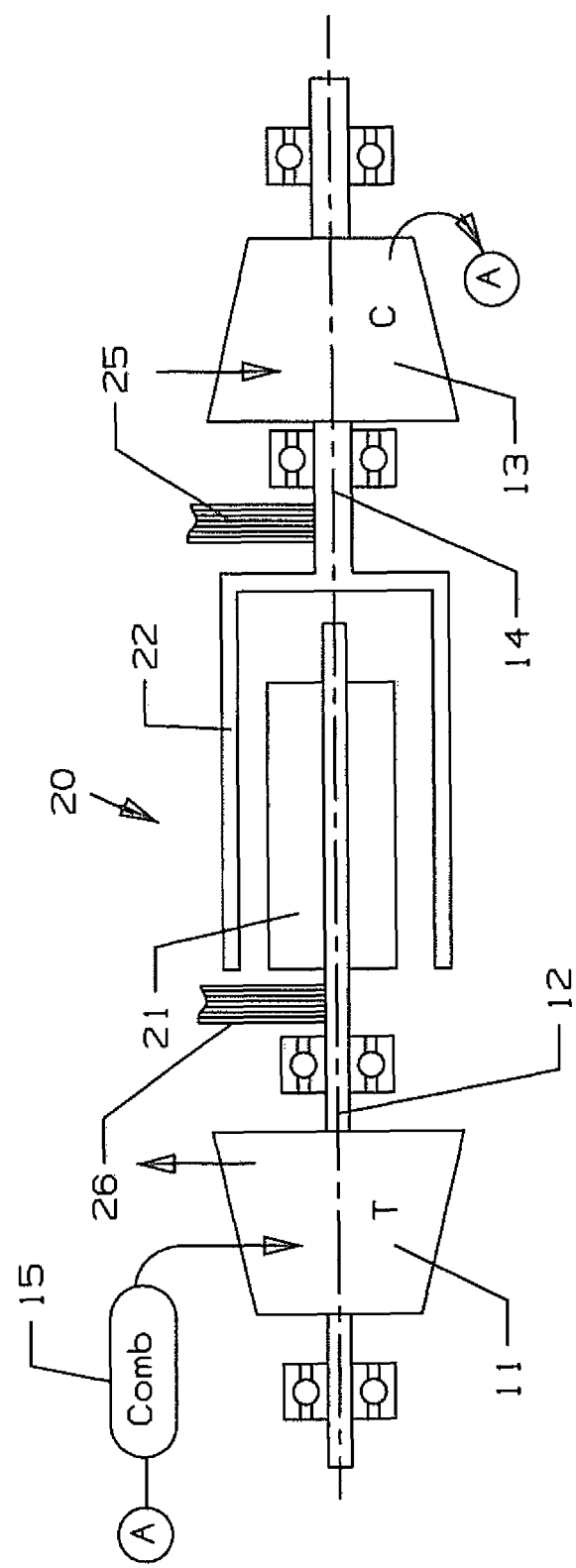
FIG. 1 shows a cross section view of the gas turbine engine with the co-rotating electric generator of the present invention.

The small gas turbine engine with the co-rotating electric generator is shown in FIG. 1 and includes a turbine 11 with one or more rows or stages of rotor blades and stator vanes to extract mechanical energy from a hot gas flow, a turbine rotor shaft 12, a compressor 13 with one or more rows of rotor blades and stator vanes to compress air for use in a combustor 15 to burn with a fuel and produce the hot gas flow that is passed through the turbine 11, and a compressor rotor shaft 14. The combustor 15 receives compressed air from the compressor 13 and delivers the hot gas flow into the inlet of the turbine 11.

A co-rotating electric generator 20 is positioned between the turbine 11 and the compressor 13 and includes a rotor 21 and a stator 22 as is typical of prior art generator where the rotor rotates within the stator to produce electrical current. In the co-rotating generator 20 of the present invention, both the rotor 21 and the stator 22 rotate in the same direction. The turbine shaft 12 is connected to the rotor 21 of the generator 20 and the compressor shaft 14 is connected to the stator 22 of the generator. However, this could be switched in that the rotor 21 can be connected to the compressor shaft 14 and the stator 22 can be connected to the turbine shaft 12. The turbine shaft 12 and the compressor shaft 14 are supported by bearings that also support the generator for rotation. In the first embodiment, both the rotor 21 and the stator 22 of the generator are formed with overhung rotor shafts in which one end of the rotor shaft is supported by a bearing while the opposite end is free floating (without a bearing). In other embodiments, bearings can be used to support both ends of both rotor shafts of the rotor and the stator to provide for addition rotational support if required.

Two wire brushes 25 and 26 are in contact with the generator to carry the electricity to a user. A first wire brush 25 is connected to the rotor shaft 14 of the stator 22 and a second wire brush is connected to the rotor shaft 12 of the rotor 21. Because the power plant of the present invention is intended for long term use, and because the wire brushes 25 and 26 will wear from high speed contact with the shaft, the wire brushes can be made very long and continuously fed toward the shaft as the wires wear. Since the power plant is intended for use on ground, the extra weight of using a long wire brush assembly will be permissible.

Both the turbine and the generator produce a reaction force due to the reaction of the rotor blades to the gas flow or the air flow that will push the turbine or compressor in one direction. In a prior art gas turbine engine, both the turbine and the compressor are connected to a common rotor shaft so that the rotor shaft will function to secure these turbo machines along an axial direction. In the power plant of the present invention in FIG. 1, the turbine shaft is separate from the compressor shaft so that the turbine and the compressor can drift apart due to the reaction forces developed within each. Thus, the turbine 11 is oriented in the direction shown in FIG. 1 so that the reaction force of the hot gas flow reacting against the rotor blades will push the turbine toward the generator 20. The compressor 13 is oriented in a direction so that the reaction force of the compressed air against the rotor blades will push the compressor toward the generator 20. The turbine and the compressor are oriented in a direction such that a reaction force created from the rotor blades acting against a gas flow such that the turbine and compressor axial thrusts will compensate each other to minimize a size of axial thrust bearings.

The main feature of the present invention is that the turbine 11 will drive the compressor 13 through the co-rotating generator 20 while electrical energy is being produced from a differential rotational speed between the rotor 21 and the stator 22 while both the rotor 21 and the stator are rotating 22 but with a difference is rotational speed of 3,000 rpm for a 50 hertz generator or 3,600 rpm for a 60 Hertz generator. The differential rotational speed of the generator can be controlled by regulating the electrical energy produced or by regulating the compressed air discharged from the compressor. With this arrangement of the co-rotating electric generator and the turbine and compressor of the gas turbine engine, the high rotational speed of the engine can be used to drive an electric generator without the need of complex and expensive power conditioning electronics that are required in the prior art high speed generators. A simple and inexpensive generator can thus be used for a small gas turbine engine that operates under high rotational speeds and without the need of a gear box to reduce the rotational speed from the IGT engine for use in a regular speed electric generator. In a particular embodiment envisioned by the applicant, a small gas turbine engine in an operating range of 50,000 rpm with operate the turbine at 53,600 rpm and the compressor at 50,000 for a difference between the rotor 21 and the stator 22 in the generator 20 of 3,600 rpm which is the 60 hertz used in generators in the USA. Other engine sizes and operating speeds can be used with the co-rotating electric generator 20 of the present invention such that the difference is rotational speeds with result in the 50 hertz or 60 hertz output.

I claim the following:

1. An electric power plant comprising:
   a high speed gas turbine engine including a turbine connected to a turbine rotor shaft and a compressor connected to a compressor rotor shaft;
   a co-rotating electric generator having a rotor and a stator that produces electrical energy when the rotor and the stator rotate at a differential speed;
   the co-rotating electric generator connected between the turbine and the compressor in which the turbine drives the compressor through the electric generator and in which the rotor and the stator of the electric generator rotate in the same rotational direction but with a differential rotational speed such that electric energy is produced;
   the rotor of the generator being connected directly to one of the compressor rotor shaft or the turbine rotor shaft; and,
   the stator of the generator being connected directly to the other of the compressor rotor shaft or the turbine rotor shaft.

2. The electric power plant of claim 1, and further comprising:
   the differential rotational speed is around 3,000 rpm or around 3,600 rpm.

3. The electric power plant of claim 1, and further comprising:
   the turbine and the compressor are oriented in a direction such that a reaction force created from the rotor blades acting against a gas flow such that the turbine and compressor axial thrusts will compensate each other to minimize a size of axial thrust bearings.

4. The electric power plant of claim 1, and further comprising:
   a wire brush in contact with a rotating surface of the electric generator to carry electricity from the generator; and,
   the wire brush being a long wire brush with an automatic continuously feed to make up for wear of the wire brush from contact with the rotating surface.

5. A process for generating electricity from a high speed rotor shaft comprising the steps of:
   directly driving a rotor of an electric generator with the high speed rotor shaft;
   directly driving a stator of the electric generator in the same direction as the rotor at a lower rotational speed than the rotor to produce electricity; and,
   rotating the rotor and the stator at a differential rotational speed of either 3,000 or 3,600 rpm.

6. The process for generating electricity of claim 5, and further comprising the step of:
   driving an external load with the stator to produce a load on the generator.

7. The process for generating electricity of claim 5, and further comprising the steps of:
   contacting a rotating surface of the generator with a wire brush to carry away electricity from the generator; and,
   continuously feeding the wire brush toward the rotating surface to make up for wear of the wire brush.

8. An electric power plant comprising:
   a compressor and a compressor rotor shaft;
   a turbine and a turbine rotor shaft;
   a co-rotating electric generator having a rotor and a stator that produces electrical energy when the rotor and the stator rotate at a differential speed;
   the rotor of the generator being connected to one of the compressor rotor shaft or the turbine rotor shaft directly;
   the stator of the generator being connected to the other of the compressor rotor shaft or the turbine rotor shaft directly; and,
   a combustor to produce a hot gas stream from compressed air from the compressor in which the hot gas stream is passed through the turbine to drive the co-rotating electric generator and the compressor.

9. The electric power plant of claim 8, and further comprising:
   the co-rotating electric generator is located between the turbine and the compressor.

10. The electric power plant of claim 8, and further comprising:
    the rotor and the stator of the generator are both overhung shafts.

11. The electric power plant of claim 8, and further comprising:
    the differential rotational speed of the generator is around 3,000 rpm or around 3,600 rpm.

12. The electric power plant of claim 8, and further comprising:
    the turbine and the compressor are oriented in a direction such that a reaction force created from the rotor blades acting against a gas flow such that the turbine and compressor axial thrusts will compensate each other to minimize a size of axial thrust bearings.

13. The electric power plant of claim 8, and further comprising:
    the turbine operates at 50,000 rpm or above.

\* \* \* \* \*